United States Patent Office 3,330,797
Patented July 11, 1967

3,330,797
FUSIBLE ELASTOMERS FROM MIXTURES OF POLYSILOXANES CONTAINING METHYL, VINYL AND HYDROGEN GROUPS WITH BORON MODIFIED SILOXANES AND PEROXIDES
Patrick McAvoy Kelly, Saltcoats, Jack Ames, Ardrossan, and James Cargill Somerville, Troon, Scotland, assignors to Imperial Chemical Industries Limited, London, England, a corporation of Great Britain
No Drawing. Filed Sept. 19, 1963, Ser. No. 310,116
Claims priority, application Great Britain, Sept. 28, 1962, 36,879/62; Nov. 12, 1962, 42,623/62
11 Claims. (Cl. 260—37)

This invention relates to new and useful polysiloxane compositions and more particularly to such compositions of the type generally known as fusible elastomers.

Organopolysiloxane compositions capable of being cured to elastomers are well known and widely used for a variety of applications. In many of these applications it is necessary or desirable for the elastomer to be capable of bonding to itself. One method which has been proposed for achieving this end is to use organopolysiloxane compositions capable of curing to the so-called fusible type of organopolysiloxane elastomer. These fusible elastomers, while having the characteristic tack-free non-adhesive surface of organopolysiloxane elastomers, have the useful property of being able to bond themselves under the influence of pressure.

An object of the present invention is to provide organopolysiloxane compositions which can be cured to organopolysiloxane elastomers which can readily be bonded to themselves. Another object is to provide such compositions which when cured can be used at elevated temperatures without serious thermal degradation and which can resist hydrolysis without loss of elastomeric properties. Other objects will appear hereinafter.

According to the present invention these objects are accomplished by a composition comprising 100 parts by weight of a diorganopolysiloxane having from 1.98 to 2.01 organo groups per silicon atom and having an average molecular weight not less than $2 \times 10^5$, up to 20 parts by weight of a linear organopolysiloxane having not less than 0.50 silicon-bonded hydrogen atoms per silicon atom and of average molecular weight not greater than 20,000, from 5 to 60 parts by weight of a boron-modified organopolysiloxane, as hereinafter defined, 15 to 100 parts by weight of a reinforcing or semi-reinforcing filler, and 0.5 to 10 parts by weight of a curing agent.

A wide variety of diorganopolysiloxanes of molecular weight not less than $2 \times 10^5$ may be used in the compositions of our invention. Thus the organo groups may be alkyl groups such as methyl or ethyl groups. Substituted alkyl groups such as fluoroalkyl, cyanoalkyl or aminoalkyl groups, aryl groups such as phenyl groups, or substituted aryl groups such as fluoaryl, cyanoaryl or aminoaryl groups or unsaturated groups such as vinyl, allyl or cyclohexenyl groups. It is however, in many cases preferred that at least a major proportion of the organo groups should be methyl groups and for some purposes it is also preferred that a minor proportion should be vinyl group. It is also normally preferred that the diorganopolysiloxane should be of average molecular weight not greater than $5 \times 10^5$.

The organo groups present in the linear organopolysiloxane containing silicon-bonded hydrogen atoms may be selected from a wide variety for example, they may be alkyl groups, such as methyl or ethyl groups, substituted alkyl groups such as fluoroalkyl, cyanoalkyl or aminoalkyl groups, aryl groups such as phenyl groups, substituted aryl groups such as fluoroaryl, cyanoaryl and aminoaryl groups, and unsaturated groups such as vinyl, aryl or cyclohexenyl groups. It is however normally preferred that the organo groups should be methyl groups. It is also preferred that the organo groups should be present in a proportion within the range of from 1.02 to 1.50 organo groups per silicon atom. It is further preferred that the linear organopolysiloxane should have an average molecular weight within the range from about 1500 to 2500.

By the phrase "boron-modified organopolysiloxane" as used herein we mean an organopolysiloxane modified by heating with a boron containing compound either alone or in the presence of other materials such as, for example, ferric chloride. The organopolysiloxane used for this purpose is preferably a linear one and may be a fluid of comparatively low molecular weight or may be of higher molecular weight. Suitable organopolysiloxanes include hydrolysis products of diorganodihalosilanes such as dimethyldichlorosilane or of mixtures such as dimethyldichlorosilane and methyltrichlorosilane, octamethylcyclotetrasiloxane and dimethylpolysiloxanes having hydroxyl groups at the ends thereof. The boron compounds with which the organopolysiloxane is modified may be a boric acid or an anhydride thereof, an alkali or alkaline earth metal derivative or metal complex of a boric acid, a boron hydride, or a complex of a boron hydride with a nitrogen compound such as ammonia or hexamethylenetetramine, a boron oxide, a hydrocarbon borate such as methyl or ethyl borate, a boron halide, a boronic acid or a diboronic acid or other similar boron-containing material. Boric acids and boric oxides are however preferred. In producing the boron modified organopolysiloxane the organopolysiloxane may be heated with from 3 to 30 parts by weight of the boron compound per 100 parts by weight of the organopolysiloxane. It is however, normally preferred that the boron compound should be used in amount from 5 to 10 parts by weight per 100 parts by weight of the organopolysiloxane. The heating to modify the organopolysiloxane may take place over a wide range of temperature, for example, 100 to 250° C. and the time of heating will, of course, depend on the temperature used. Thus, for example, it is in many cases convenient to heat for 2 to 3 hours at a temperature of about 150 to 200° C. While the proportions of boron modified organopolysiloxane in the compositions of our invention may vary considerably for example, from 5 to 60 parts by weight per 100 parts by weight diorganopolysiloxane.

A wide variety of reinforcing and semi-reinforcing fillers may be used in the composition of our invention. Suitable reinforcing fillers include fume silicas, precipitated silicas and silica aerogels of particle size not greater than about 50 m$\mu$ while semi-reinforcing fillers include those and similar materials of particle size from about 50 m$\mu$ to about 1$\mu$. Fillers which have been found to be eminently suitable include the "Aerosils," which are fume silicas varying in surface area from about 175 sq.m./g. to about 380 sq.m./g. and particle size of from 3 to 40 m$\mu$, "Hi-Sil" X303 which is a precipitated silica of particle size of about 22 m$\mu$ and of surface area 160 sq.m./g. and "Santocell" C which is a silica aerogel of particle size of about 30 m$\mu$ and of surface area 150 sq.m./g. While the filler or fillers may be used in widely varying proportions, for example, from 10 to 40 parts by weight of reinforcing filler of 15 to 100 parts by weight of total filler per 100 parts by weight of diorganopolysiloxane it is normally preferred to use reinforcing fillers in amounts from 15 to 25 parts by weight per 100 parts by weight of the diorganopolysiloxane. The fillers used may if desired, be treated before use, for example, with an organopolysiloxane such as octamethylcyclotetrasiloxane.

Any of the well known curing agents used for the curing of organopolysiloxane compositions to elastomers may be used in the compositions of our invention. Suitable curing agents include organic peroxides such as, for example, benzoyl peroxide, 2:4-dichlorobenzoyl peroxide, dicumyl peroxide, di-tert-butyl-peroxide, tert-butyl peracetate, tert-butylcumyl peroxide, 2:5-dimethyl-2:5-di-(tert-butyl peroxy)hexane and 2:5-dimethyl-2:5-di(tert-butyl peroxy)hexyne-3. It is in general, preferred, to use the catalyst in amounts of the order of from 1 to 5 parts by weight per 100 parts by weight of the diorganopolysiloxane. The temperature selected for curing and the time required will depend largely on the particular curing agent used, for example, a composition containing di-tert-butyl peroxide may be cured by pressing for about 10 minutes at a temperature of 170° C. while one containing 2:4-dichlorobenzoyl peroxide may be cured by pressing for about 10 minutes at about 110° C. The cured elastomer may be after-cured for example, by heating for 1 hour at 150° C.

The compositions of our invention may be made by blending together the necessary constituents in any convenient order by any of the techniques used in the rubber industry, for example, a suitable type of incorporator can be used or a two roll mill may be used. The compositions so produced are highly suitable for processing by any of the conventional techniques, for example, such as pressing in sheet form, extrusion as tapes or other extruded sections, calendering or dispersion in a solvent for use as a dip-coating medium. The compositions may of course, also be applied to a fabric substrate, for example, of glasscloth by calendering, dipping in a solvent dispersion or knife coating, followed by curing. The cured coating obtained can be made to adhere to itself by pressure alone. If desired, however the bonding process may be accelerated by heating. Since an improved bond develops if the cured composition is elongated it is in many cases advantageous to use as a substrate a fabric cut on the bias.

Our invention is further illustrated by the following examples in which all parts and percentages are by weight.

*Example 1*

75 parts of a methylvinylpolysiloxane gum containing 0.1 mol percent vinyl groups and of average molecular weight $5 \times 10^5$, 25 parts of a boron-modified organopolysiloxane prepared as described below, 20 parts of "Aerosil" FK3 (a fume silica of average particle size 10–40 m$\mu$ and and surface area 175 m.sq./g.) 10 parts of a methylhydrogenpolysiloxane fluid of average molecular weight about 2500 and H/Si ratio 0.96 to 1, 5 parts of red iron oxide and 2.5 parts of benzoyl peroxide were intimately mixed together on a rubber mill. 15 parts of this composition were then dispersed in 100 parts of toluene and 2.5 mm. wide tape of heat desized glass-cloth, of thickness 0.127 mm. passed through the dispersion at a rate of 61 cm. per minute. The coated glasscloth was then passed up a tower heated to 80° C. over a period of 15 minutes and down a further tower heated at 130° C. over a further period of 15 minutes to give a tape coated with a cured elastomer. 2.5 mm. wide strips of this coated type were then wrapped on a 12.7 mm. diameter mandrel. The strips showed good adhesion and after 4 days at room temperature the peel strength of layers of elastomer was 0.54 kg. per cm. After a post-curing by heating at 150° C. for 1 hour the peel strength rose to 1.25 kg. per cm.

The boron-modified organopolysiloxane was prepared by mixing 9 parts of orthoboric acid and 100 parts of a α,ω-dihydroxydimethylpolysiloxane of viscosity 3000 cp. at 25° C. and thereafter heating the mixture for 1.75 hours at 150, and 1 hour at 200° C.

*Example 2*

A boron modified organosiloxane was prepared by mixing together 5 parts of boric oxide, 0.2 part of ferric chloride and 100 parts of the hydrolysis product of dimethyldichlorosilane and methyltrichlorosilane in the ratio 99:1 by weight and thereafter heating the mixture for 2.75 hours at 150° C.

20 parts of the so obtained boron-modified organopolysiloxane, 80 parts of a methylvinyl polysiloxane gum containing 0.1 mol percent vinyl groups and of average molecular weight $3 \times 10^5$, 20 parts of organopolysiloxane treated Aerosil FK3, 10 parts of a trimethylsilyl end stopped methylhydrogenpolysiloxane fluid of average molecular weight 2500 and H/Si ratio 0.96 to 1, 3 parts red iron oxide, and 2.0 parts of benzoyl peroxide were intimately mixed together on a rubber mill.

28 parts of this composition were then dispersed in 100 parts of toluene to give a dispersion of viscosity approximately 1500 cp. Tapes were prepared from this dispersion in the manner described in Example 1. 2.5 mm. diameter wide tapes were then wrapped on a 12.7 mm. diameter mandrel and conditioned for 1 hour at 25° C. A peel strength of 0.45 kg. per cm. was required to unwind the tape from the mandrel. After heating a similarly prepared sample for 1 hour at 150° C. a peel strength of 1.52 kg. per cm. was required to unwrap the tape.

*Example 3*

The procedure of Example 2 with the omission of the red iron oxide was followed.

Tapes prepared from this formulation were translucent and exhibited a slightly higher degree of auto-adhesion over the tapes prepared in the manner described in Example 2. Peel strengths of 0.80 kg. per cm. and 1.70 kg. per cm. respectively were obtained after conditioning for 1 hour at 25° C. and 1 hour at 150° C.

*Examples 4–7*

Compositions containing finely divided silica in varying proportions were prepared from the proportions of ingredients shown below.

The boron modified organosiloxane was prepared by mixing together 7.5 parts of orthoboric acid and 100 parts of octamethylcyclotetrasiloxane and thereafter heating the mixture for 3 hours at 175° C.

|  | A | B | C | D |
|---|---|---|---|---|
| Boron modified organopolysiloxane | 20 | 20 | 20 | 20 |
| Methylvinylpolysiloxane [1] | 80 | 80 | 80 | 80 |
| Methylhydrogenpolysiloxane [1] | 10 | 10 | 10 | 10 |
| Red Iron Oxide | 5 | 5 | 5 | 5 |
| Benzoyl peroxide | 2.5 | 2.5 | 2.5 | 2.5 |
| Aerosil FK3 [2] | 15 | 20 | 25 | 30 |

[1] As in Example 1.
[2] Treated with octamethylcyclotetrasiloxane.

Tapes were prepared in the manner described in Example 1. 2.5 mm. wide strips of these were then treated for peel strength as described in Example 2. The results are shown.

|  | A | B | C | D |
|---|---|---|---|---|
| 1 hr. at 25° C. (Kg./cm.) | 1.06 | 0.81 | 0.63 | 0.43 |
| 1 hr. at 150° C. (Kg./cm.) | 1.76 | 1.68 | 1.43 | 1.28 |

What we claim is:
1. A composition as claimed in claim 11 wherein the amount of boron compound is from 5 to 10 parts by weight per 100 parts by weight of the organopolysiloxane.

2. A composition as claimed in claim 6 wherein the boron-modified dimethylpolysiloxane is present in amount from 30 to 50 parts by weight per 100 parts by weight of the methylvinylpolysiloxane.

3. A composition as claimed in claim 6 wherein there is present from 15 to 25 parts by weight of reinforcing fillers per 100 parts by weight of the diorganopolysiloxane.

4. A composition as claimed in claim 6 wherein the fillers prior to use have been treated with an organopolysiloxane.

5. Articles including coated fabrics comprising an elastomer produced by curing a composition claimed in claim 6.

6. A composition comprising (a) 100 parts by weight of a methylvinylpolysiloxane having from 1.98 to 2.01 organo groups per silicon atom, and having an average molecular weight not less than $2 \times 10^5$, (b) a linear methylhydrogenpolysiloxane having not less than 0.50 silicon-bonded hydrogen atoms per silicon-atom and of average molecular weight not greater than 20,000 in an amount of up to 20 parts by weight, (c) from 5 to 60 parts by weight of the product obtained by reacting dimethylpolysiloxane and a boron compound selected from the group consisting of boric acid and boric oxide at about 100 to 250° C., (d) 15 to 100 parts by weight of a filler settled from the group consisting of reinforcing fillers and semi-reinforcing fillers and (e) 0.5 to 10 parts by weight of a peroxide curing agent.

7. A composition as claimed in claim 6 wherein said methylvinylpolysiloxane is of an average molecular weight not greater than $5 \times 10^5$.

8. A composition as claimed in claim 6 wherein said methylhydrogenpolysiloxane contains from about 1.02 to about 1.50 methyl groups per silicon atom.

9. A composition as claimed in claim 6 wherein said methylhydrogenpolysiloxane is of an average molecular weight of from 1,500 to 2,500.

10. A composition as claimed in said claim 6 wherein said dimethylpolysiloxane, which is modified with a boron compound, is prepared from a linear dimethylsiloxane monomer.

11. A composition as claimed in claim 6 wherein said dimethylpolysiloxane modified with a boron compound contains from 3 to 30 parts by weight of said boron compound to each 100 parts by weight of said dimethylpolysiloxane.

References Cited
UNITED STATES PATENTS

| | | |
|---|---|---|
| 2,448,556 | 9/1948 | Sprung et al. |
| 2,873,265 | 2/1959 | Rust. |
| 2,983,697 | 5/1961 | Brown et al. |
| 3,146,799 | 9/1964 | Fekete. |

MORRIS LIEBMAN, *Primary Examiner.*

J. E. CALLAGHAN, *Assistant Examiner.*